(12) United States Patent
Sable et al.

(10) Patent No.: US 12,525,914 B2
(45) Date of Patent: Jan. 13, 2026

(54) SOLAR MODULE COUPLINGS FOR SOLAR TRACKER

(71) Applicant: Nextracker LLC, Fremont, CA (US)

(72) Inventors: Abhimanyu Anil Sable, Telangana (IN); Ashwajit Wahane, Maharashtra (IN); Jitendra Morankar, Hyderabad (IN); Phani Kumar, Hyderabad (IN); Raghavendra Praveen Maddulapalli, Andhra Pradesh (IN); Venkata Nitin Mythreya Yadlapalli, Nellore (IN)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/668,583

(22) Filed: May 20, 2024

(65) Prior Publication Data

US 2024/0396490 A1    Nov. 28, 2024

Related U.S. Application Data

(60) Provisional application No. 63/468,183, filed on May 22, 2023.

(51) Int. Cl.
H02S 20/32     (2014.01)

(52) U.S. Cl.
CPC .................... *H02S 20/32* (2014.12)

(58) Field of Classification Search
CPC .................................. H02S 20/00–32

USPC .................................... 136/243–265
See application file for complete search history.

(56) References Cited

U.S. PATENT DOCUMENTS

| 9,276,521 | B2 | 3/2016 | Reed et al. | |
|---|---|---|---|---|
| 2012/0285507 | A1* | 11/2012 | Rettger | H10F 77/488 |
| | | | | 136/246 |
| 2016/0028345 | A1 | 1/2016 | Wares et al. | |
| 2016/0298354 | A1* | 10/2016 | Gauché | F16M 11/24 |
| 2017/0294870 | A1* | 10/2017 | Almy | F24S 25/63 |
| 2022/0193927 | A1* | 6/2022 | Mazzetti, Jr. | B25J 9/1697 |
| 2022/0294386 | A1 | 9/2022 | Creasy et al. | |

FOREIGN PATENT DOCUMENTS

| TW | 201202591 A | 1/2012 |
|---|---|---|
| WO | 2020225251 A1 | 11/2020 |

OTHER PUBLICATIONS

International Searching Authority "International Search Report and Written Opinion" From Application No. PCT/US2024/030186, Mailed Sep. 19, 2024, pp. 14.

* cited by examiner

*Primary Examiner* — Bach T Dinh
(74) *Attorney, Agent, or Firm* — Fredrikson & Byron, P.A.

(57) ABSTRACT

A coupling for use with a solar tracker including an upper portion and a lower portion, the upper portion including a generally tubular body including one or more stamped end portions and the lower portion designed to secure the upper portion to a support rail of a solar power system.

19 Claims, 15 Drawing Sheets

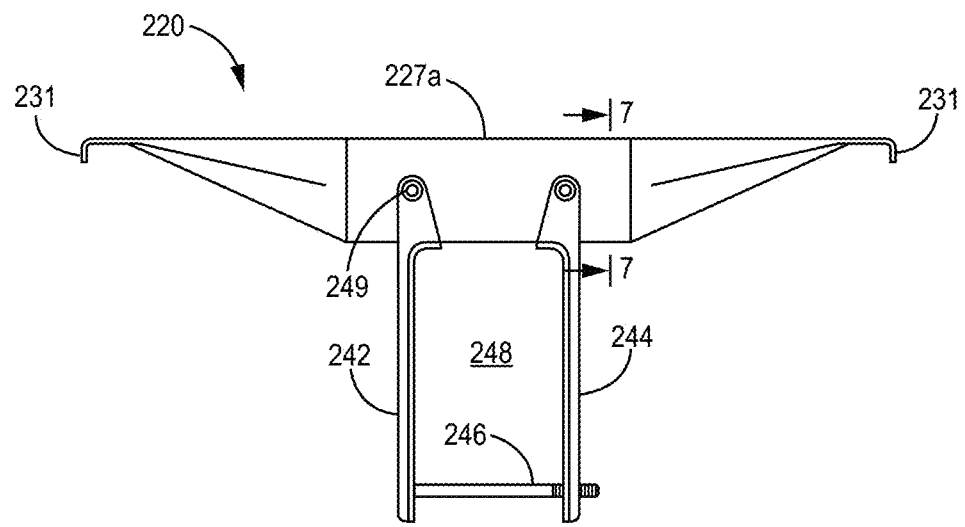
FIG. 4B
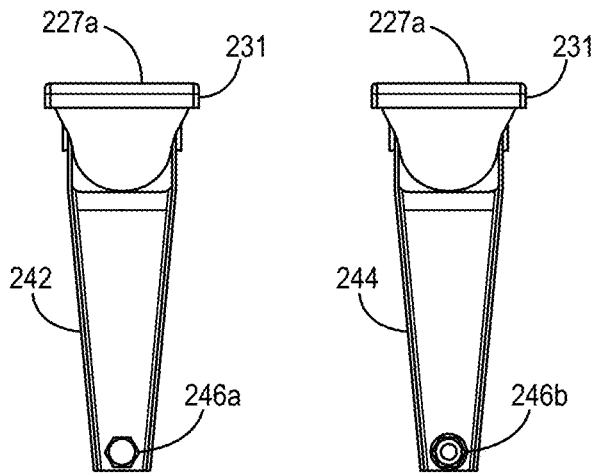
FIG. 4C   FIG. 4D

SOLAR MODULE COUPLINGS FOR SOLAR TRACKER

RELATED APPLICATIONS

This application claims the benefit of U.S. Provisional Patent Application No. 63/468,183, filed May 22, 2023, the entire contents of which are incorporated herein by reference.

FIELD

The present disclosure relates to solar power generation systems, and more particularly, to couplings and coupling systems for securing solar modules to a support structure.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Mechanically connecting the numerous solar modules to the support structure across a great length can expose the solar modules, as well as the support structure and/or any couplings connecting the two, to stresses resulting from being outdoors and being exposed to the elements, such as snow, wind, hail, sleet, ice, sand, dirt, fallen objects, etc. In some instances, numerous solar modules may be mechanically connected to a support structure using a coupling derived from molding or pressing a flat sheet into the final shape of the coupling. Although at least some of these couplings may provide an adequate amount of support for solar modules, couplings derived from molding or pressing of a flat sheet may evenly distribute a low level of resistance or strength across the entire length of the coupling. It would be beneficial to provide couplings displaying enhanced strength to withstand greater stresses, and particularly wherein the ends of the coupling display a greater strength than a middle part of the coupling.

SUMMARY

In accordance with an aspect of the present disclosure, couplings for use with a solar tracker are described. The coupling includes an upper and lower portion. The upper portion includes a generally tubular body extending between a proximal end portion and a distal end portion with a central portion extending therebetween. At least one of the proximal or distal end portions is in a stamped configuration. The lower portion extends from the upper portion and is configured to secure the upper portion and/or coupling to a support rail or torque tube of a solar tracker.

In accordance with another aspect of the present disclosure, methods of forming a coupling for supporting a solar module on a support rail of a solar tracker are described. The methods include: providing a preformed tubular body including a proximal end portion, a distal end portion, and a central portion positioned therebetween, the central portion defining a shaped cross-section; stamping the proximal end portion into a proximal stamped configuration; stamping the distal end portion into a distal stamped configuration; and drilling one or more side or bottom apertures through the central body portion, the apertures configured to attach a lower portion to the tubular body.

BRIEF DESCRIPTION OF THE DRAWINGS

Various aspects and features of the present disclosure are described hereinbelow with reference to the drawings, wherein:

FIG. 4B is a side view of the coupling of FIG. 4A as described in at least one embodiment herein;

FIGS. 4C and 4D are a front and rear view, respectively, of the coupling of FIG. 4A as described in at least one embodiment herein;

DETAILED DESCRIPTION

The present disclosure is directed to a coupling for supporting a solar module on a support rail (e.g., torque tube) of a solar tracker. Generally, the coupling includes a tubular central portion positioned between a pair of end portions of enhanced strength. The coupling includes a topside contact surface configured to have one or more solar modules and/or additional rails positioned thereon and/or secured thereto. The coupling also includes an underside contact surface configured to be placed on and/or secured to a support rail or torque tube.

Figure 1:
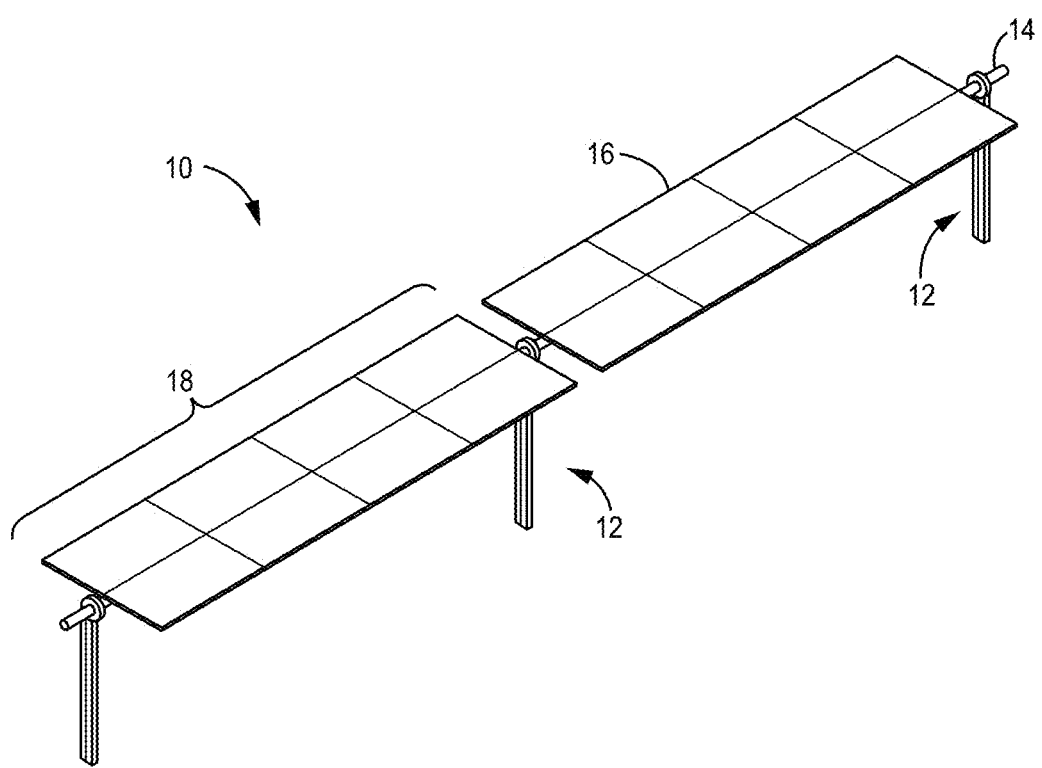
FIG. 1 is a top perspective view of a solar power system as described in at least one embodiment herein.

Referring now to the drawings, FIG. 1 illustrates a solar power system or solar tracker provided in accordance with the present disclosure and generally identified by reference numeral 10. Piers 12 are spanned by a support rail, such as torque tube 14. A plurality of solar modules 16 are supported by and permitted to rotate with the torque tube 14. A distance between two piers 12, where the plurality of solar modules 16 are supported by the torque tube 14 define a bar 18. In FIG. 1, the solar modules 16 are arranged in a "two-in landscape" arrangement where the longer side of the solar module 16 is arranged parallel to the longitudinal axis of the torque tube 14. However, the solar modules 16 may be arranged in a "two-in portrait" arrangement where the shorter side of the solar module 16 is arranged parallel with the longitudinal axis of the torque tube 14 or even just "one-in portrait" without departing from the scope of the present disclosure. In embodiments, each solar tracker 10 will be formed of a plurality of bays 18, with each bay 18 being between 50 and 100 feet in length. The torque tube 14 is connected to a motor or dive device (not shown), which is mechanically connected to the torque tube 14 to rotate the torque tube 14 and therewith the solar modules 16 such that the solar modules 14 follow the path of the sun. While not illustrated in FIG. 1, a plurality of solar trackers 10 may be arranged in a parallel orientation with one another as part of a grid tied solar power plant outputting electrical energy for use by customers of the electrical grid.

As can be appreciated, the solar modules 16 must be supported on and/or secured to the torque tube 14. In embodiments, a bracket system (not shown) is coupled to the torque tube 14 that extends substantially perpendicular to the longitudinal axis of the torque tube 14. The torque tube 14 is rotatably about its longitudinal axis to adjust an angular orientation of the solar modules 16 relative to the sun, while supporting the solar modules 16 on the bracket system. It is envisioned that the bracketing system can take many forms including one or more of the couplings described herein, alone or in combination with other bracket components.

The couplings described herein are derived from a preformed tubular body of any cross-sectional shape (e.g., polygonal or non-polygonal). One or more of the end portions of the preformed tubular body can be stamped into a stamped shape displaying a different cross-sectional shape than the original preformed tubular cross-sectional shape. Because the stamped one or more end portions are derived from the preformed tubular body, as opposed to sheets of the same material, the one or more stamped end portions display a needed enhanced strength, as opposed to couplings derived from sheets of material. The enhanced strength may be sufficient to prevent damage (e.g., twisting, warping, breaking, etc.) to the solar modules, support rails, and/or the coupling itself, when exposed to outside elements, such as wind, rain, snow, ice, hail, sleet, sand, flooding, falling objects, and the like.

With reference to FIGS. 2A-2F, a coupling for use with a solar module 16, as provided in at least some embodiments, is illustrated and generally identified by reference numeral 20. The coupling 20 may include an upper portion 21 configured to support a solar module (or additional rail) thereon and a lower portion 23 configured to fix the coupling 20 to a support rail or torque tube.

Figure 2A:
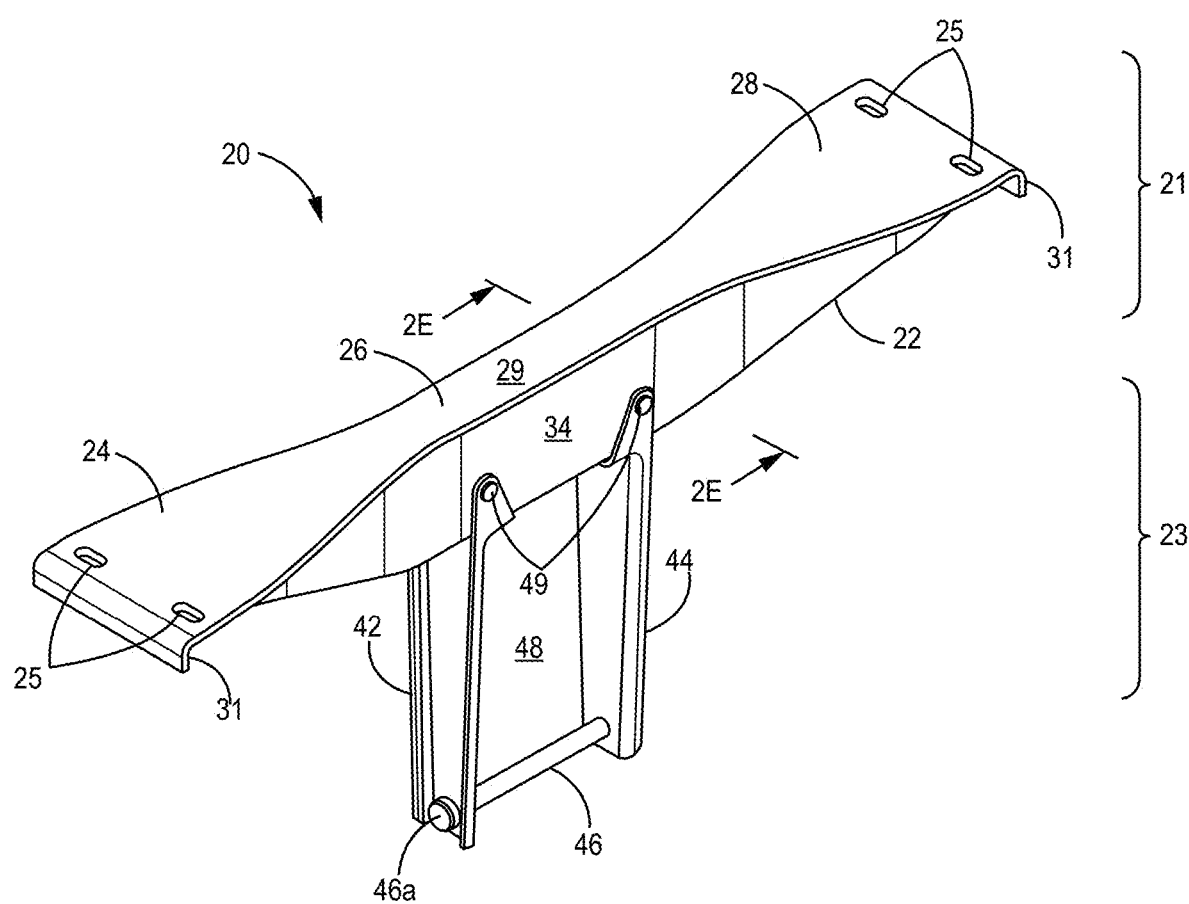
FIG. 2A is a top perspective view of a coupling as described in at least one embodiment herein.
Figure 2B:
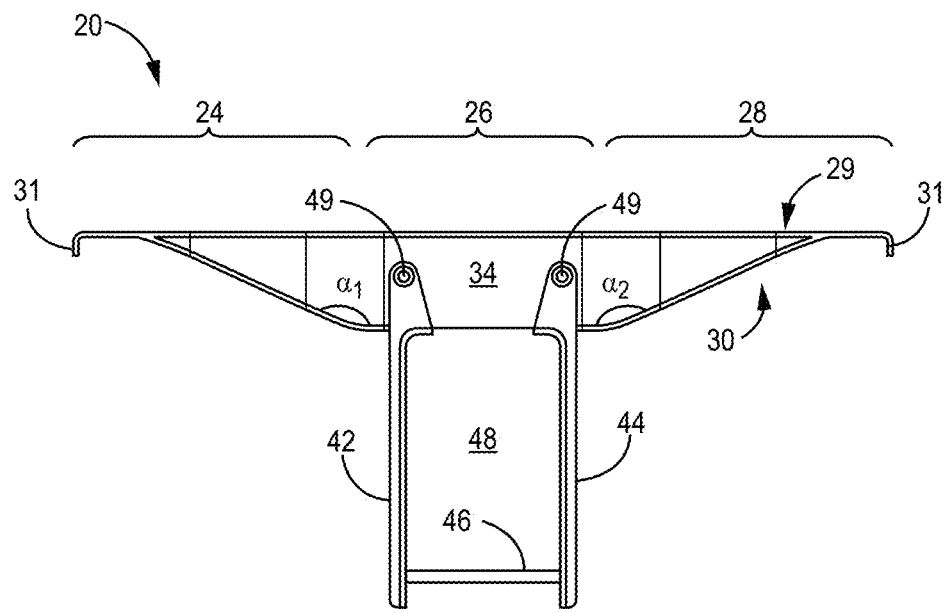
FIG. 2B is a side view of the coupling of FIG. 2A as described in at least one embodiment herein.
Figures 2C, 2D:
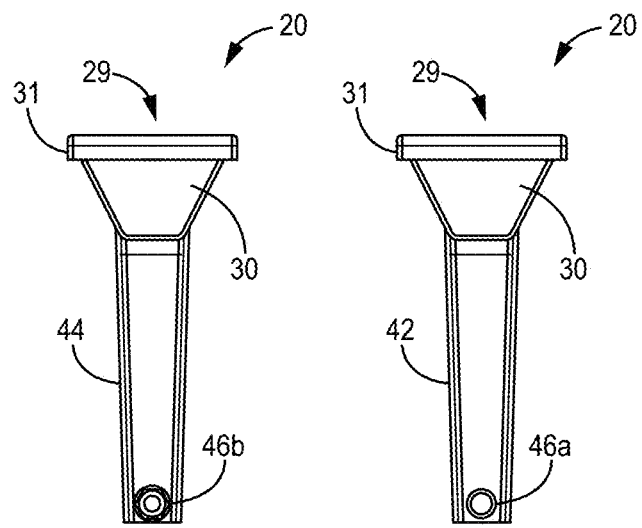
FIGS. 2C and 2D are a front and rear view, respectively, of the coupling of FIG. 2A as described in at least one embodiment herein.
Figure 2E:
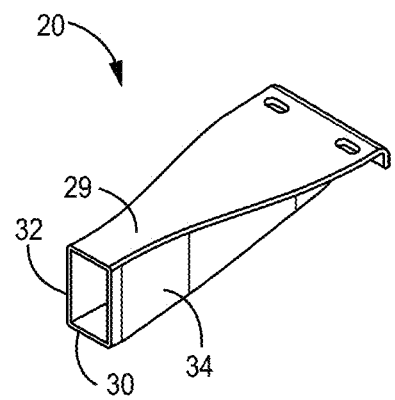
FIG. 2E is a cross-sectional perspective view of the coupling of FIG. 2A as described in at least one embodiment herein.
Figure 2F:
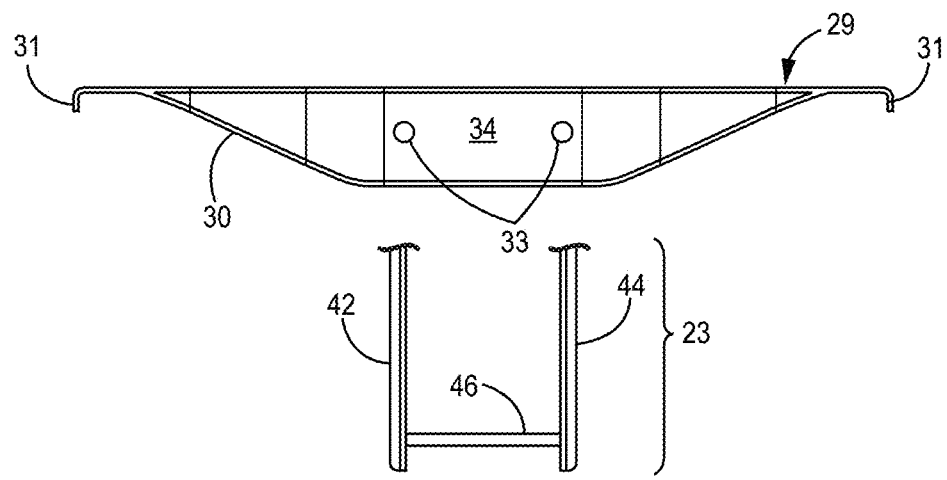
FIG. 2F is a side cut-out view of the coupling of FIG. 2A as described in at least one embodiment herein.
Figure 3A:
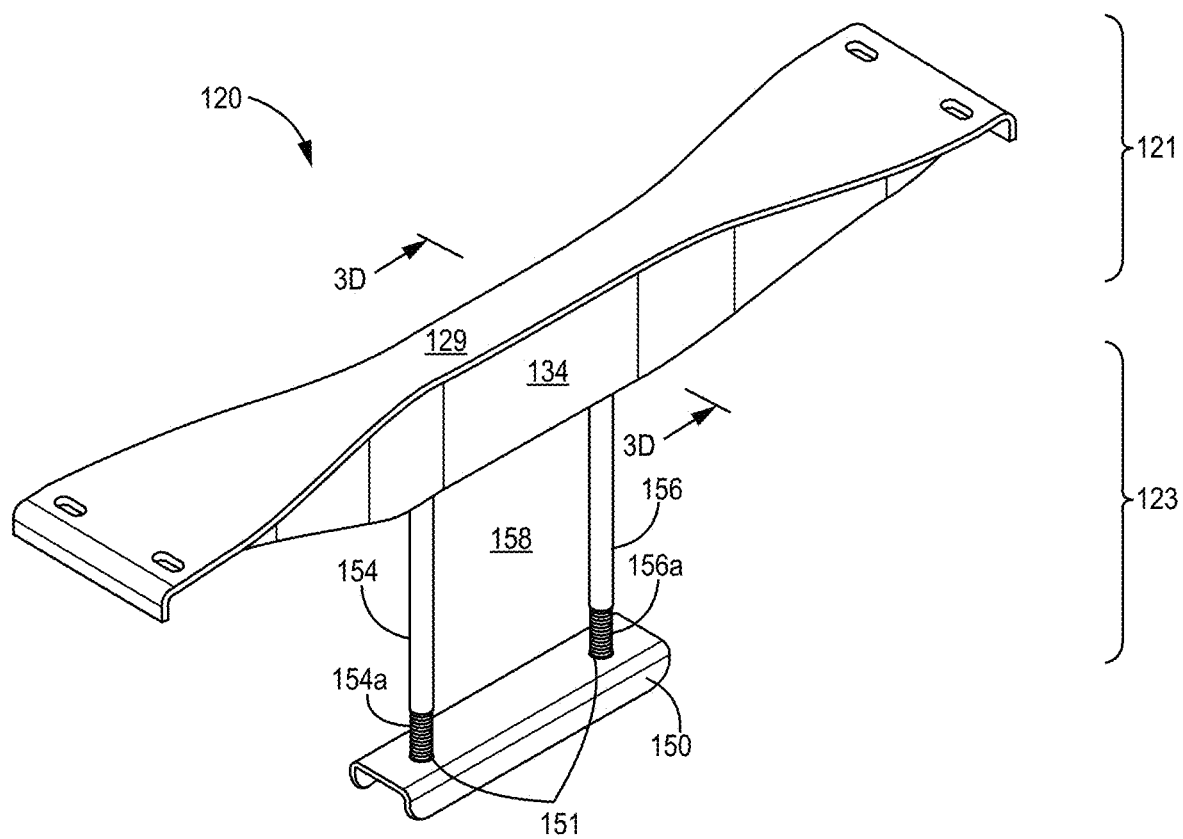
FIG. 3A is a top perspective view of a coupling as described in at least one embodiment herein.
Figure 3B:
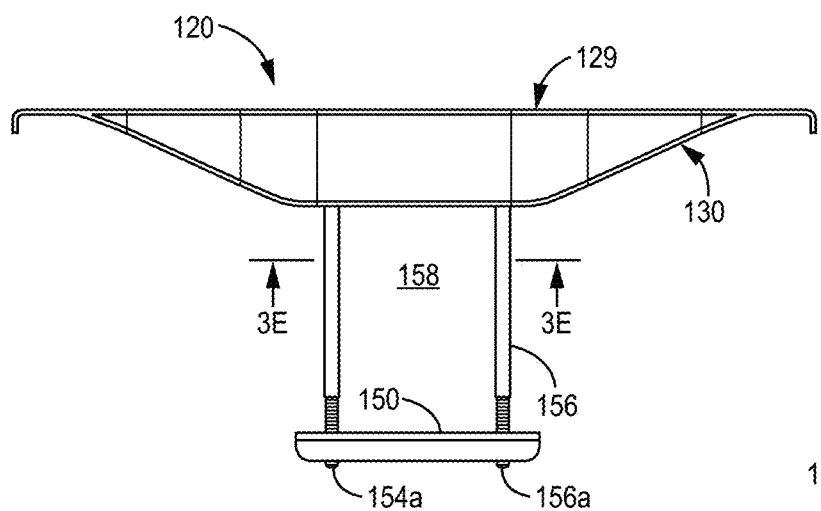
FIG. 3B is a side view of the coupling of FIG. 3A as described in at least one embodiment herein.
Figure 3C:
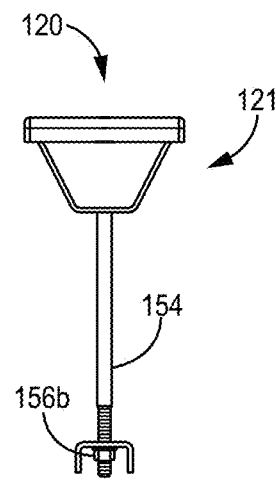
FIG. 3C is a front view of the coupling of FIG. 3A as described in at least one embodiment herein.
Figure 3D:
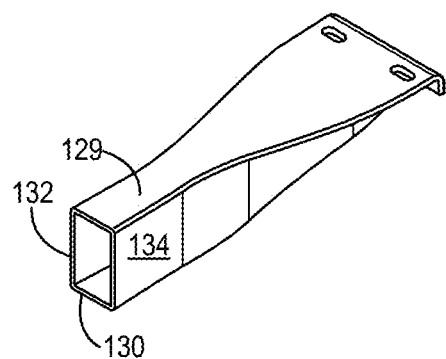
FIG. 3D is a cross-sectional perspective view of the coupling of FIG. 3A as described in at least one embodiment herein.
Figure 3E:
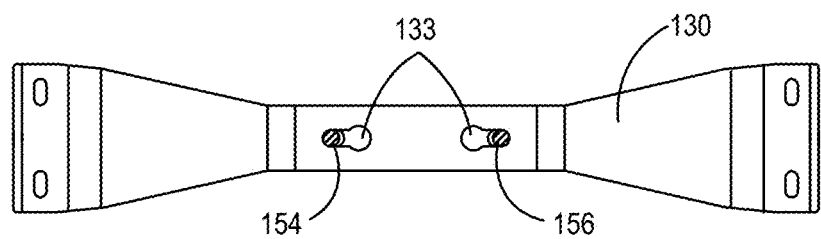
FIG. 3E is a side cut-out view of the coupling of FIG. 3A as described in at least one embodiment herein.

The upper portion 21 includes a generally tubular body 22 extending between a proximal end portion 24 and distal end portion 28 with a central portion 26 therebetween. The central portion 26 of the tubular body 22 may define a generally rectangular cross-section. However, the central portion 26 of the tubular body 22 may define any shape in cross-section, including but not limited to, polygonal (e.g., triangular, square, pentagonal, hexagonal, heptagonal, octagonal, trapezoidal, etc.), circular, elliptical, star-shaped, and the like. One or more of the proximal and distal end portions 24, 28, respectively, are in a stamped configuration, i.e., the end portion(s) of a first preformed tubular body are stamped into the stamp configuration shown. In the stamped configuration, the proximal and distal end portions 24, 28, respectively, may be wider than the central portion 26. In some embodiments, the tubular body 22, and particularly the central portion 26, may also be hollow (FIG. 2E).

As further depicted in FIGS. 2A-2F, in some embodiments, the body 20 may include a top wall 29 connected to a bottom wall 30 (opposite the top wall 29) by a first side wall 32 and a second side wall 34 (opposite the first side wall 32), each extending from the proximal end portion 24 to the distal end portion 28. The top wall 29 may be a generally flat or planar top wall 29 along a length of the body. The top wall 29 may define a contact surface upon which one or more solar modules (or additional rails) may be secured.

In some embodiments, at least one, if not both, of the proximal and distal end portions of the top wall 29 are wider than the central portion of the top wall 29. In some embodiments, the proximal end portion of the top wall 29 widens proximally from the central portion of the top wall 29. In some embodiments, the distal end portion of the top wall 29 widens distally from the central portion of the top wall 29. In some embodiments, the top wall 29 may be bow-tie shaped.

The bottom wall 30 may be non-planar or may include one or more bends along a length of the body. In some embodiments, as shown in FIG. 2B, the bottom wall 30 may include a first bend defining a first obtuse angle a1 between the central portion 26 and the proximal end portion 24, and second bend defining a second obtuse angle a2 between the central portion 26 and the distal end portion 28. The first and second obtuse angles a1, a2, respectively, in some embodiments, may range from about 120 to about 150 degrees. The bottom wall 30, like the top wall 29, may also include proximal and/or distal end portions that are wider than and/or widen from the central portion, however in a non-planar configuration.

As yet further depicted in FIGS. 2A-2F, the lower portion 23 may include at least one, if not a pair, of bracket arms 42, 44 and a bracket connector 46 defining a support opening 48 therebetween (including a portion of bottom wall 30). The support opening 48 is configured to receive a support rail or torque tube therethrough. In some embodiments, the first and second bracket arms 42, 44 are attached to the body 22 via one or more bracket fasteners 49 via side apertures 33. One or more of the bracket arms 42, 44 may be configured to pivot about the bracket fastener 49 relative to the body 22. The bracket connector 46 is configured to connect and/or lock the first and second bracket arms 42, 44 respectively, to each other on their respective free ends and/or on an underside of a rail or torque tube (opposite a top side of the rail or torque tube upon which the upper portion of the coupling is configured to sit). Some non-limiting examples of a suitable bracket connector 46 include a screw, bolt (with or without nut), rivet, pin, and/or male/female type connections. In some embodiments, the bracket connector is a threaded bolt 46a and nut 46b.

In some embodiments, the top wall 29 and/or bottom wall 30 may include one or more mounting apertures 25 defined therethrough for attachment of the solar modules (or additional rails) to the coupling 20, and more particularly on top of the top wall 29 of the coupling 20. In some embodiments, the top wall 29 and/or bottom wall 30 may include one or more end tabs 31 extending generally perpendicular to the top or bottom wall 29, 30, respectively.

FIGS. 3A-3E depict another coupling 120 as described in at least one embodiment herein. The upper portion 121 of the coupling 120 is substantially the same as the upper portion 21 of the coupling 20 of FIGS. 2A-2F (e.g., includes a top wall 129, a bottom wall 130, and a pair of sidewalls 132, 134). However, in some embodiments, the sidewalls 132, 134 of the upper portion 121 may be free of side apertures, while the bottom wall 130 may further include one or more bottom apertures 133 configured to attach the lower portion 123 thereto. In some embodiments, the bottom apertures 133 are key-hole shaped apertures.

As further depicted in FIGS. 3A-3E, the lower portion 123 of the coupling 120 is free of bracket arms and includes a base plate 150 separated from the body 122 by a pair of spaced base plate connectors 154, 156 defining a support opening 158 therebetween. The base plate 150 includes a generally planar top surface and includes a pair of base plate apertures 151 defined therethrough. The base plate apertures 151 are designed to receive a portion of the base plate connectors 154, 156 therein. The base plate connectors 154, 156 may include, but not limited to, a screw, bolt (with or without nut), rivet, pin, and/or male/female type connections. In some embodiments, the base plate connectors are a threaded bolt 154a, 156a and nut 154b, 156b.

Although FIGS. 2A-3E depict the lower portions 23, 123 (e.g., the bracket arms, base plate, or base plate connectors) of the couplings 20, 120 as defining a generally rectangular shaped support opening 48, 148, any polygonal or non-polygonal shaped support opening is envisioned.

With reference to FIGS. 4A-4F, another coupling for use with a solar module 16, as provided in at least some embodiments, is illustrated and generally identified by reference numeral 220. The coupling 220 includes an upper portion 221 configured to support one or more solar modules (or additional rail) thereon and a lower portion 223 configured to fix the coupling to a rail or torque tube.

Figure 4A:
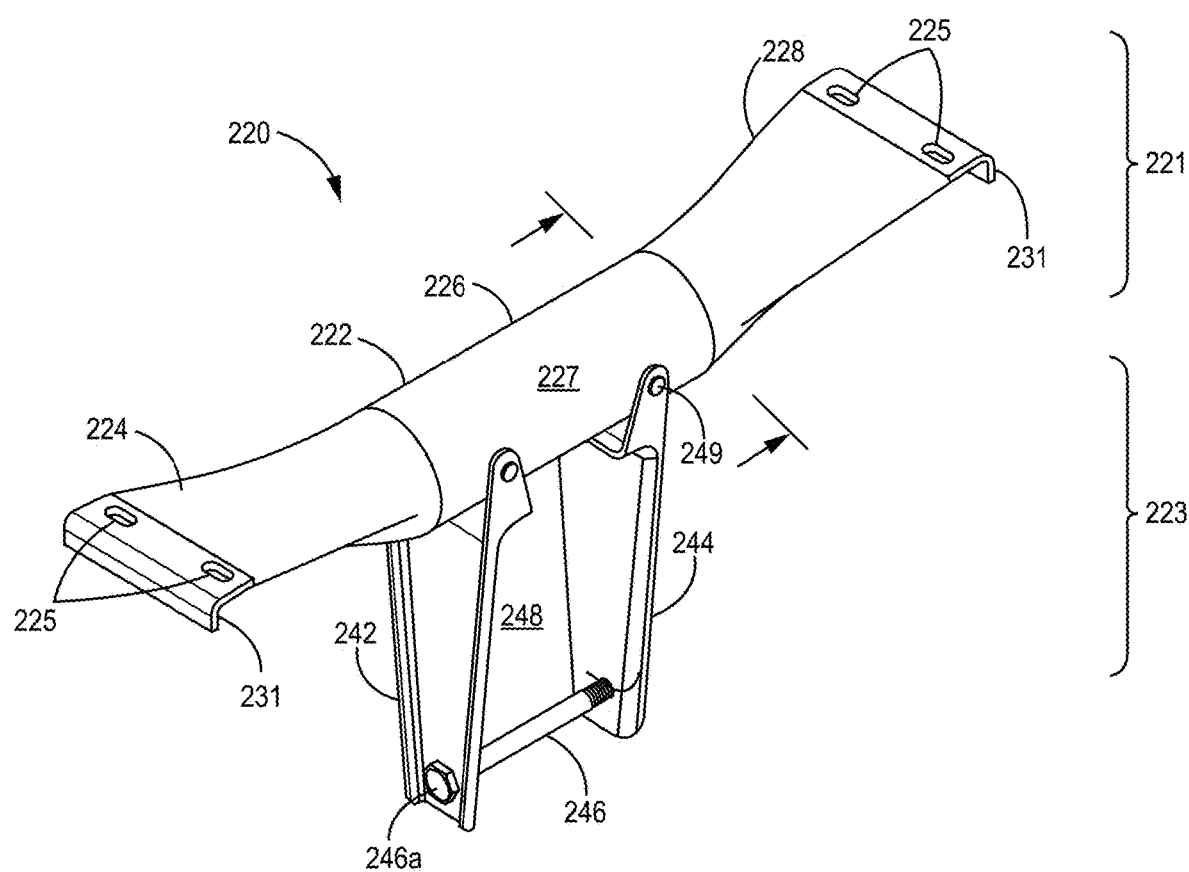
FIG. 4A is a top perspective view of a coupling as described in at least one embodiment herein.
Figure 4E:
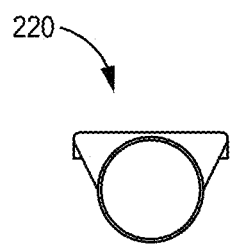
FIG. 4E is a cross-sectional perspective view of the coupling of FIG. 4A as described in at least one embodiment herein.
Figure 4F:
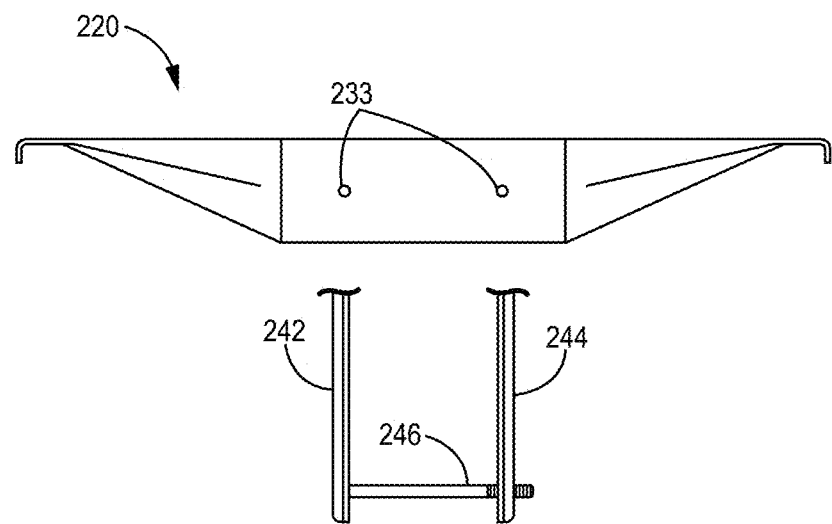
FIG. 4F is a side cut-out view of the coupling of FIG. 4A as described in at least one embodiment herein.
Figure 5A:
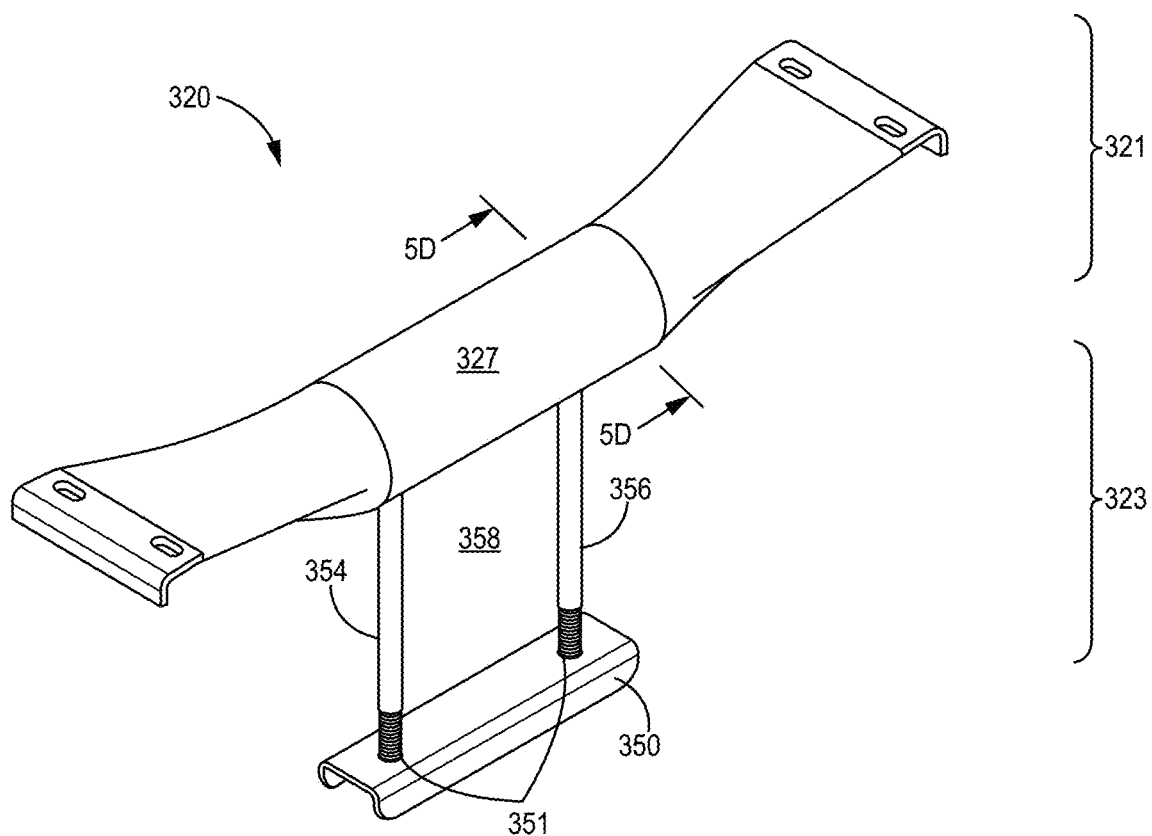
FIG. 5A is a top perspective view of a coupling as described in at least one embodiment herein.
Figure 5B:
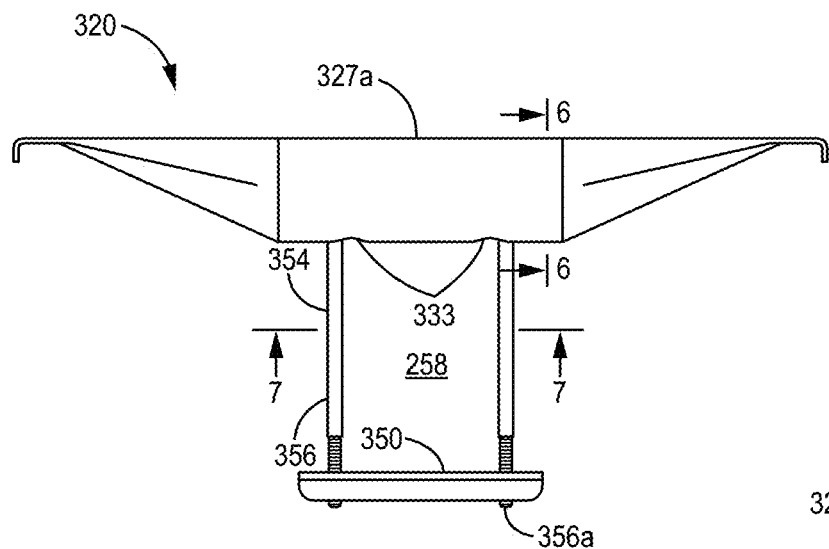
FIG. 5B is a side view of the coupling of FIG. 5A as described in at least one embodiment herein.
Figure 5C:
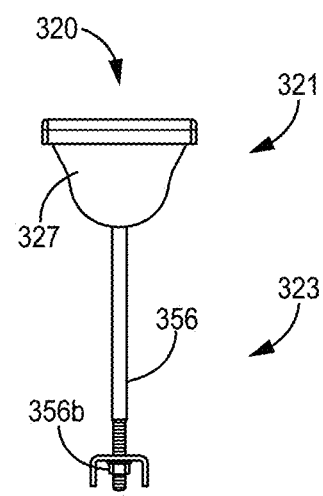
FIG. 5C is a front view of the coupling of FIG. 5A as described in at least one embodiment herein.
Figure 5D:
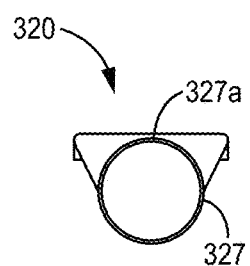
FIG. 5D is a cross-sectional perspective view of the coupling of FIG. 5A as described in at least one embodiment herein.
Figure 5E:
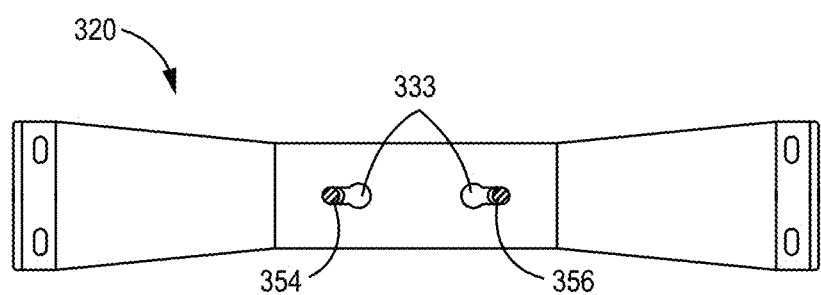
FIG. 5E is a side cut-out view of the coupling of FIG. 5A as described in at least one embodiment herein.

The upper portion 221 includes a generally tubular body 222 extending between a proximal end portion 224 and distal end portion 228 with a central portion 226 positioned therebetween. The central portion 226 of tubular body 222 defines a generally circular cross-section and/or is hollow (FIG. 4E). One or more of the proximal and distal end portions 224, 228, respectively, are in a stamped configuration, i.e., the end portion(s) of a first preformed tubular body are stamped into the stamp configuration shown. At least one, if not both, of the proximal and distal end portions 224, 228 respectively, may be wider than the central portion 226 in the stamped configuration as shown.

As further depicted in FIGS. 4A-4F, in some embodiments, the body 220 may include a single outer wall 227 defining the circular central portion 226. In some embodiments, the proximal and distal end portions 224, 228 respectively, of a circular body 226 may include a stamped or pressed single outer wall. In some embodiments, the proximal and/or distal end portions 224, 228 respectively may further include a crease 229 formed generally along a length thereof in the stamped configuration.

An underside of the proximal and/or distal end portions 224, 228 respectively, may include a first bend defining a first obtuse angle a1 between the central portion 226 and the proximal end portion 224, and second bend defining a second obtuse angle a2 between the central portion 226 and the distal end portion 228. The first and second obtuse angles a1, a2 respectively, in some embodiments, may range from about 120 to about 150 degrees.

As yet further depicted in FIGS. 4A-4F, the lower portion 223 of the body 222 of the coupling 220 may include at least one, if not a pair, of bracket arms 242, 244 and a bracket connector 246 defining a support opening 248 therebetween. The opening 248 is configured to receive a support rail or torque tube therethrough. In some embodiments, the first and second bracket arms 242, 244 are attached to the body 222 via one or more bracket fasteners 249 via side apertures 233. One or more of the bracket arms 242, 244 may be configured to pivot about the bracket fastener 249 relative to the body 222. The bracket connecter 246 is configured to connect and/or lock the first and second bracket arms 242, 244 respectively, to each other on their respective free ends and/or on an underside of a rail or torque tube (opposite a top side of the rail or torque tube upon which the upper portion or body is configured to sit). Some examples of a suitable bracket connector 246 may include, but not limited to, a screw, bolt (with or without nut), rivet, pin, and/or male/female type connections. In some embodiments, the bracket connector 246 is a threaded bolt 246a and nut 246b.

In some embodiments, the outer wall 227 may further include one or more mounting apertures 225 defined therethrough for attachment of the solar modules to the coupling 220. In some embodiments, the outer wall 227 may include one or more end tabs 231 on one or more proximal and/or distal ends 224, 228 respectively, thereof and extending generally perpendicular to a top contact surface 227a of the outer wall 227.

FIGS. 5A-5E depict another coupling 320 as described in at least one embodiment herein. The upper portion 321 of the coupling 320 is substantially the same as the upper portion 221 of the coupling 220 of FIGS. 4A-4F (e.g., includes a single outer wall 327). However, in some embodiments as further shown in FIGS. 5A-5E, the outer wall 327 of the upper portion 321 is free of side apertures and includes one or more underside apertures 333 configured to attach the lower portion 323 thereto. In some embodiments, the underside apertures 333 are key-hole shaped apertures.

As further depicted in FIGS. 5A-5E, in some embodiments, the lower portion 323 is free of bracket arms and includes a base plate 350 separated from the body 320 by a pair of spaced base plate connectors 354, 356 defining a support opening 358. The base plate 350 includes a generally planar top surface including a pair of base plate apertures 351 defined therethrough. The base plate apertures 351 configured to receive the base plate connectors 354, 356 therein. The base plate connectors 354, 356 may include, but not limited to, a screw, bolt (with or without nut), rivet, pin, and/or male/female type connections. In some embodiments, the base plate connectors are a threaded bolt 354a, 356a and nut 354b, 356b.

Figure 6A:
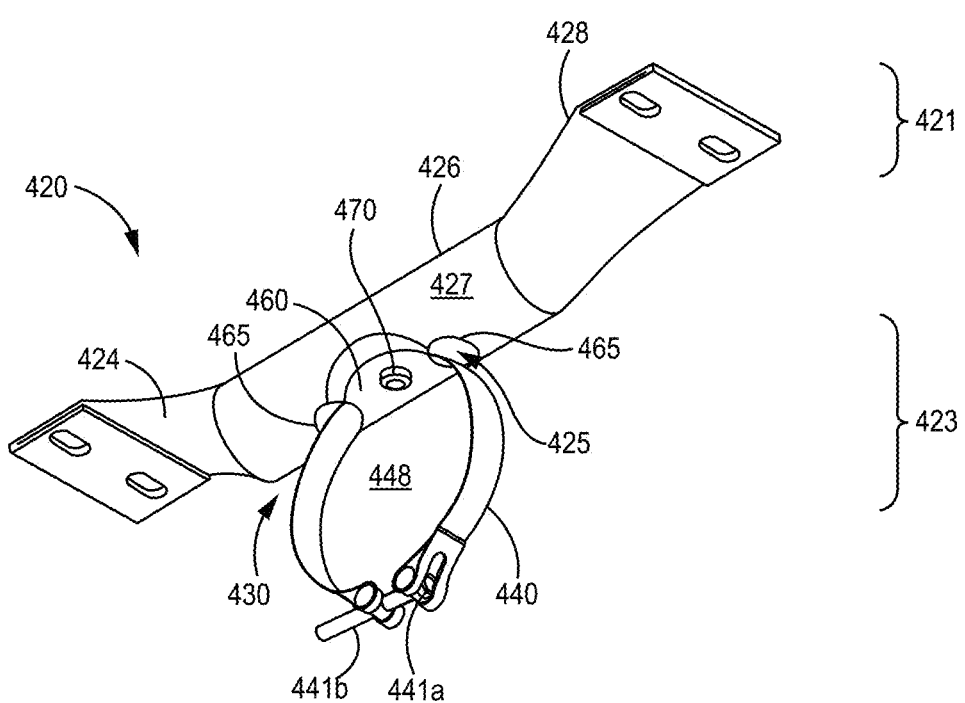
FIG. 6A is a top perspective view of a coupling as described in at least one embodiment herein.
Figure 6B:
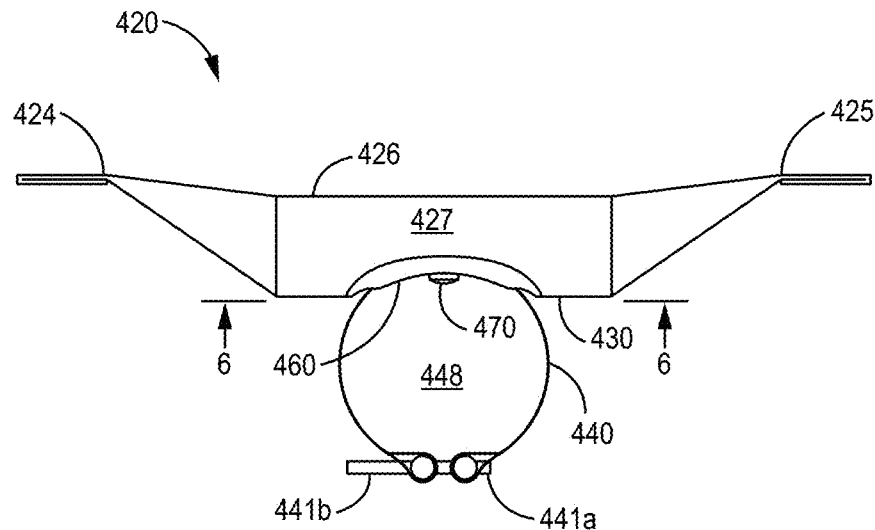
FIG. 6B is a side view of the coupling of FIG. 6A as described in at least one embodiment herein.
Figure 6C:
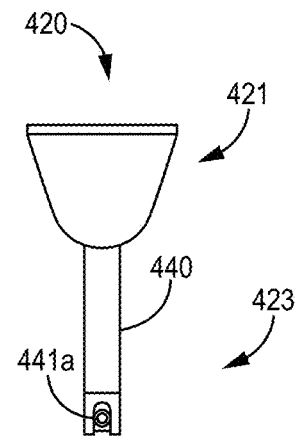
FIG. 6C is a front view of the coupling of FIG. 6A as described in at least one embodiment herein.

FIGS. 6A-6C depict yet another coupling 420 as described in at least one embodiment herein. The upper portion 421 of the coupling 420 is substantially the same as the upper portion 221 of the coupling 220 of FIGS. 4A-4F (e.g., includes a single outer wall 427). However, in some embodiments as further shown in FIGS. 6A-6C, the underside 430 of the outer wall 427 includes at least one recess 460 therein. The underside recess 460 is shown as concave but may define an indent of any configuration suitable for mating with a given support rail. The underside apertures 465 may be positioned on opposite end portions of the underside recess 460. In addition, the underside may also include a locking member or dimple 470 extending therefrom. The locking member or dimple 470 may be centered on the underside recess 460 and/or between the underside apertures 465.

The underside apertures 465 are configured to allow a lower portion 423 of the coupling 420 to enter into, extend through, and/or exit out of an inner portion 425 of the central portion 426 of the body 420. In some embodiments, a lower portion 423 of the coupling 420 may be a strap 440. The strap includes a central strap portion 442 positioned between opposite end portions 441, 443, respectively.

As further shown in FIGS. 6A-6C, a central portion of the strap 440 can be positioned inside the central portion 426 of the body 420 to hold the upper portion 421 against the support rail via the strap 440. In some embodiments, the strap 440 may also include a strap locking member or dimple (not shown) configured to interact with the locking member or dimple 470 of the body 422 to center or properly seat the strap 440 on the body 422.

Any of the various couplings described herein may be made from any suitable material including, but not limited to, metals, such as steel or aluminum.

Methods of forming a coupling as described herein, for supporting a solar module on a support rail of a solar tracker, include: providing a preformed tubular body including a proximal end portion, a distal end portion, and a central portion positioned therebetween; stamping the proximal end portion into a proximal stamped configuration; stamping the distal end portion into a distal stamped configuration; and drilling one or more side or bottom apertures through the central body portion, the apertures configured to attach a lower portion to the tubular body. In some embodiments, the preformed tubular body defines a circular cross-section. In some embodiments, the preformed tubular body defines a rectangular cross-section. In some embodiments, the proximal end portion in the proximal stamped configuration is wider than the central body portion. In some embodiments, the distal end portion in the distal stamped configuration is wider than the central body portion. In some embodiments, the bottom apertures are drilled into a keyhole shape.

The methods may further include attaching the lower portion to the tubular body. In some embodiments, the lower portion includes bracket arms and a bracket connector. In some embodiments, the lower portion includes a base plate and a pair of base connectors. In some embodiments, the lower portion is a strap.

The methods may further include forming a recess in the underside of the tubular body. In some embodiments, the recess is concave.

The methods may further include adding a locking member to the underside of the tubular body. In some embodiments, the locking member is centered on the underside recess.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling for use with a support rail of a solar tracker, comprising:
an upper portion including a top wall, a bottom wall, and a pair of opposite sidewalls forming a generally tubular body extending between a proximal end portion and a distal end portion with a central portion extending therebetween, the top wall being planar, at least one of the proximal and distal end portions in a stamped configuration such that a width of the upper portion along the top wall widens in a direction from the top wall at the central portion toward the top wall at at least one of the proximal and distal end portions; and
a lower portion extending from the upper portion, the lower portion configured to secure the coupling to a support rail of a solar tracker.

2. The coupling of claim 1, wherein the central portion defines a generally rectangular cross-section.

3. The coupling of claim 2, wherein the bottom wall is non-planar.

4. The coupling of claim 1, wherein the proximal and distal end portions are wider than the central portion.

5. The coupling of claim 1, wherein the central portion further comprises one or more side or underside apertures through which the lower portion is attached to the upper portion.

6. The coupling of claim 5, wherein the side or underside apertures are keyhole shaped.

7. The coupling of claim 5, wherein the lower portion comprises a pair of bracket arms attached to the upper portion via fasteners through the one or more side apertures and a bracket connector configured to connect free ends of the pair of bracket arms, wherein the pair of bracket arms and the bracket connector define a support opening therebetween.

8. The coupling of claim 6, wherein the lower portion comprises a base plate and a pair of base plate connectors attached to the upper portion via fasteners through the one or more bottom keyhole shaped apertures, wherein the base plate and the pair of base plate connectors define a support opening therebetween.

9. The coupling of claim 1, wherein the central portion further comprises an underside recess center on an underside thereof.

10. The coupling of claim 9, wherein the recess is concave.

11. The coupling of claim 9, further comprising a dimple centered on the underside recess.

12. The coupling of claim 9, further comprising a pair of underside apertures positioned on opposite ends of the recess, the underside apertures configured to allow a strap to pass therethrough and into an inner portion of the central portion.

13. The coupling of claim 1, further comprising one or more mounting apertures on a top surface of the proximal or distal end portions of the upper portion.

14. The coupling of claim 1, further comprising an end tab extending perpendicularly from an end of a top surface of the proximal or distal end portions of the upper portion.

15. A method of forming a coupling for supporting a solar module on a support rail of a solar tracker, comprising:
providing a preformed tubular body formed by a top wall, a bottom wall, and a pair of opposite sidewalls, the top wall being planar, the preformed tubular body including a proximal end portion, a distal end portion, and a central portion positioned therebetween, the central portion defining a shaped cross-section;
stamping the proximal end portion into a proximal stamped configuration;
stamping the distal end portion into a distal stamped configuration;
wherein the proximal stamped configuration includes a width of the top wall widening in a direction from the top wall at the central portion toward the top wall at the proximal end portion, and wherein the distal stamped configuration includes the width of the top wall widening in a direction from the top wall at the central portion toward the top wall at the distal end portion; and
drilling one or more side or bottom apertures through the central body portion, the apertures configured to attach a lower portion to the tubular body.

16. The method of claim 15, further comprising attaching the lower portion to the tubular body.

17. The method of claim 15, further comprising forming a recess in the underside of the tubular body.

18. The method of claim 15, further comprising adding a locking member to the underside of the tubular body.

19. The method of claim 15, wherein the bottom wall is non-planar.

* * * * *